Dec. 14, 1926.
C. R. ROCHE
1,610,885
MOTOR VEHICLE
Filed Nov. 12, 1921      2 Sheets-Sheet 1
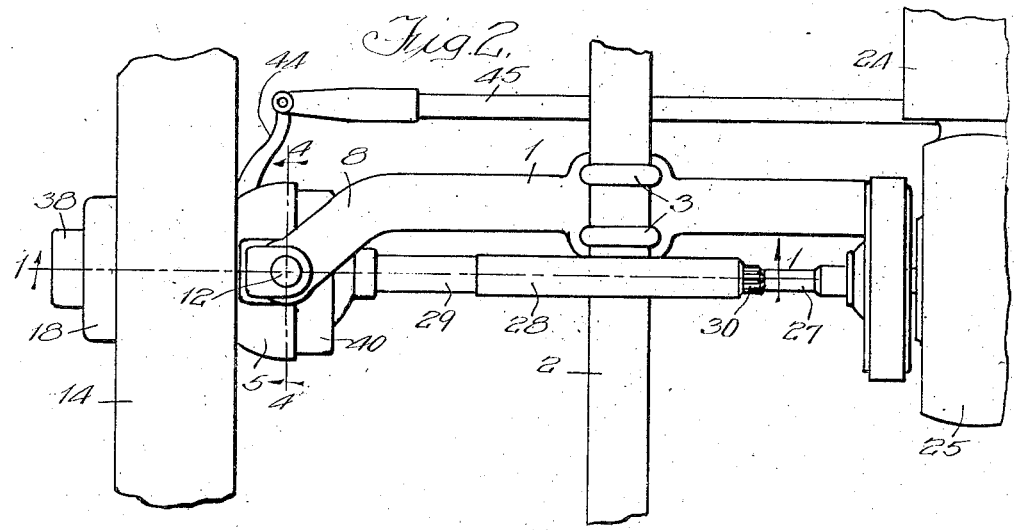
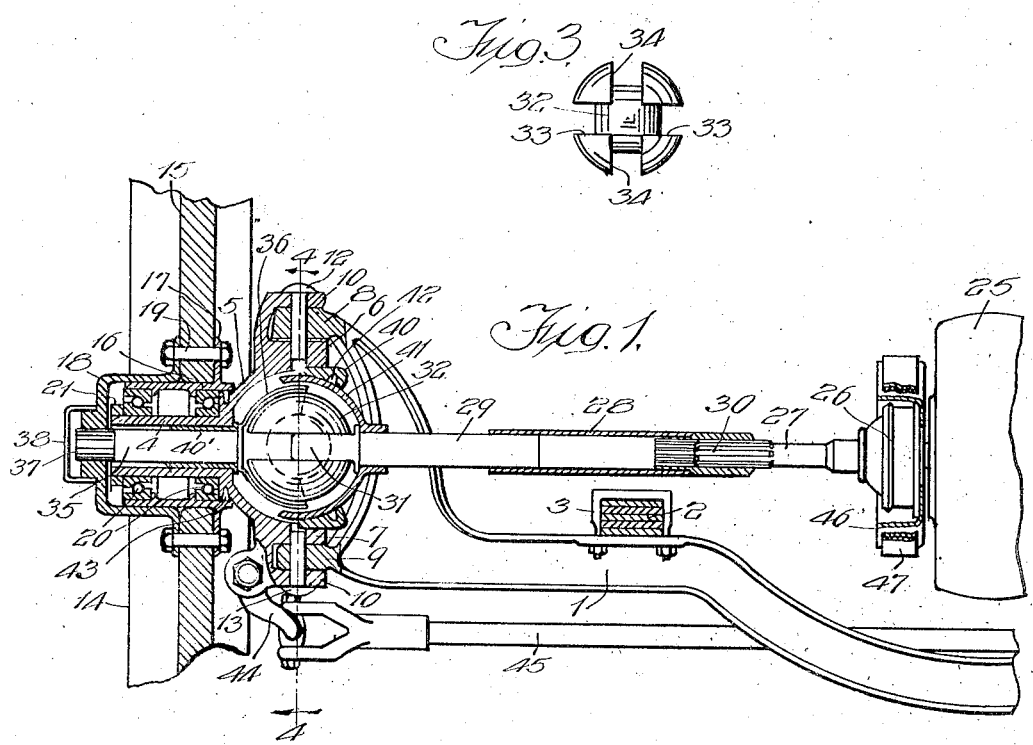
Inventor:
Clifton R. Roche Dec. 14, 1926.

C. R. ROCHE 1,610,885

MOTOR VEHICLE

Filed Nov. 12, 1921    2 Sheets-Sheet 2

Inventor,
Clifton R. Roche
By Hill & Hill, Attys.

Patented Dec. 14, 1926.

1,610,885

UNITED STATES PATENT OFFICE.

CLIFTON R. ROCHE, OF CHICAGO, ILLINOIS, ASSIGNOR TO THE HAMLIN-HOLMES MOTOR COMPANY, OF CHICAGO, ILLINOIS, A CORPORATION OF DELAWARE.

MOTOR VEHICLE.

Application filed November 12, 1921. Serial No. 514,721.

My invention belongs to that general class of devices known as motor vehicles, and relates particularly to a wheel driving mechanism which is so arranged as to permit movement or adjustment of the wheels for steering purposes. The same relates to a construction particularly adapted for vehicle use where it is desired to drive the vehicle through the front wheels, or that is, for use on a front wheel drive. The inven- has among its objects the production of a device of the kind described that is simple, convenient, durable, efficient and satisfactory for use wherever found applicable. More particularly it has as an object the production of a mechanism of the kind described consisting of a small number of parts which may be economically manufactured, is comparatively light weight, and which makes possible an improved vehicle which may be so designed as to materially reduce the weight of the vehicle and the assembly of the parts. Many other objects and advantages of the construction herein shown and described will be obvious to those skilled in the art from the disclosure herein given.

To this end my invention consists in the novel construction, arrangement and combination of parts herein shown and described, and more particularly pointed out in the claim.

In the drawings, wherein like reference characters indicate like or corresponding parts;

Figure 1 is a sectional view and elevation of one side of my improved mechanism;

Figure 2 is a top plan view of the same;

Figure 3 is a view in elevation of the ball in the universal;

Figure 4:
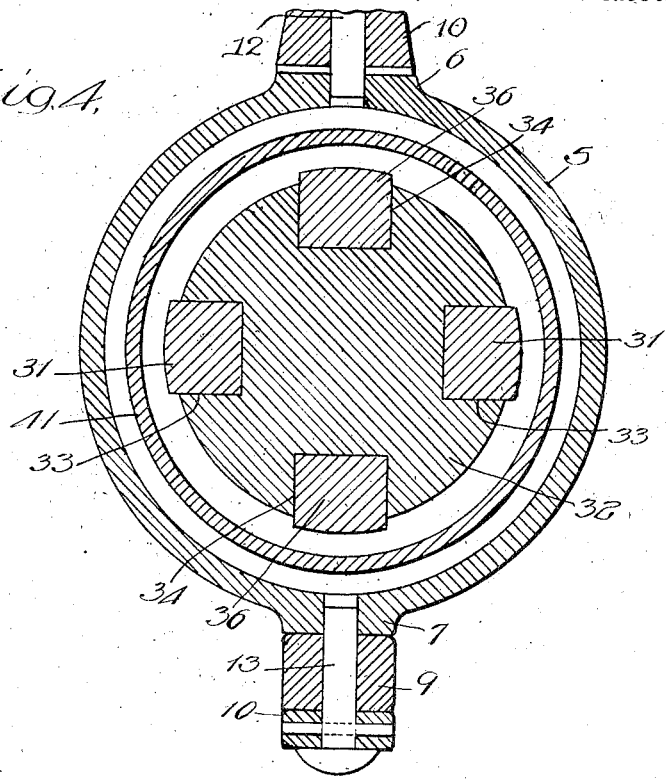
Figure 4 is a sectional view taken substantially on line 4—4 of Figure 1.
Figure 5:
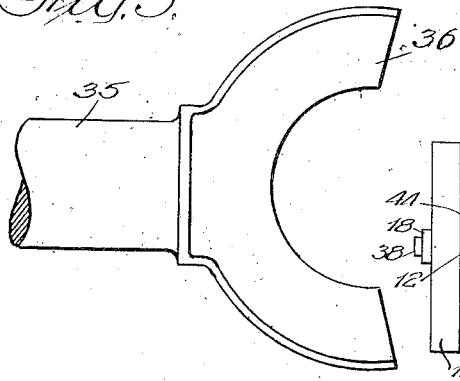
Figure 5 is an elevation of one of the shaft parts.
Figure 6:
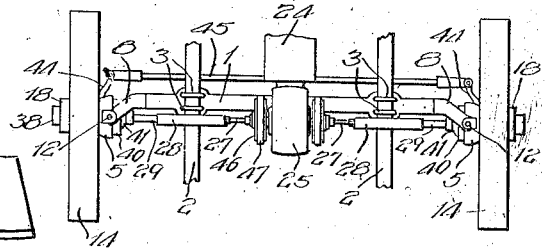
Figure 6 is a top plan view of the complete unit.

Referring to the drawings in which the preferred embodiment of my invention is shown, 1 represents an axle of a vehicle. In the case illustrated the front axle, and 2 and 3 represent the springs and spring clips carried thereby, which springs carry the frame and various parts mounted thereon. In the particular type of vehicle illustrated the springs through the frame and other parts carry the various parts of the driving mechanism including the differential, transmission, etc. The axle is provided with a steering knuckle consisting of a tubular spindle 4 provided with an inner end constructed to provide a housing 5. The same is provided with the portions 6 and 7 adapted to cooperate with the forked ends 8 and 9 of the axle. The housing part is also preferably provided with parts 10 over and underlying the forked axle parts 8 and 9. The knuckle is secured to the forks 8 and 9 by means of the pins or bolts 12 and 13, or their equivalent for the purpose, secured in place in any suitable manner, the arrangement being such that the spindle moves in an angle at the end of the axle. The other end of the axle is similarly provided with a knuckle, and it may be mentioned that substantially all of the mechanism shown in Figure 1 for one side of the vehicle is similarly provided on the other side, that is to say the wheels at the opposite sides are constructed and driven similarly.

While it is substantially immaterial what type of wheel is employed, it may be mentioned that the wheel 14 shown is provided with spokes 15, or the equivalent, seated on and secured to the sleeve 16 which sleeve is shown provided with a flange 17. There is also provided a sleeve 18 similarly flanged which fits over the sleeve 16, the sleeve part 18 being secured to the flange 17 on sleeve 16, or the equivalent, by any suitable means, as for example bolts 19. As shown the wheel is mounted on the tubular spindle 4, suitable anti-friction bearings are, however, preferably arranged between the sleeve 16 and the spindle. These bearings may be of any type suitable for the purpose, such as roller bearings, ball bearings, etc., ball bearings 20 being illustrated. Figure 1 illustrates the bearing construction referred to, but obviously this may be modified as desired. I have shown the wheel and bearings retained on the spindle by a nut 21, which maintains the parts assembled and permits the bearings to take the thrust of the wheel on the spindle as well as carry the load.

Referring to Figure 2, I have shown the transmission housing 24 carrying the differential housing 25, it being understood that any preferred or standard transmission or differential may be employed and inasmuch as these parts are well known to those skilled in the art, I have not considered it necessary to illustrate them in detail. The differential has a stub shaft projecting at each side and which is drivingly connected with the two wheels in a manner to be hereinafter described. As shown, these shafts are connected through a universal joint 26 with a shaft 27, the universal joint being of standard or any desired design. Shaft 27 is operatively connected with a shaft 29, preferably through a sleeve 28 secured to the shaft 29 arranged to receive the splined end 30 of the shaft 27. The shaft 29 is provided with a forked end 31—31. Arranged in the housing 5 is a ball member 32 provided with mutually transverse grooves 33—34 about the exterior, as most clearly shown in Figure 3. The groove 33 for instance is adapted to receive the forks 31. Also projecting from the housing through the spindle 4 is a shaft part 35 which is provided with the forked end 36, the forks 36 being adapted to engage in one of the grooves, for example 34 of the ball. It will be noted that the center of the ball is in alignment with the pivotal axis or point of connection of the knuckle with the axle 1 so that the ball universal joint will adjust itself with the knuckle when the same may be turned for steering purposes. Shaft 35 projects beyond the spindle 4 and engages with the member 18, the end of the shaft being preferably splined, keyed or otherwise connected to the member 18 so that as the shaft part 35 is driven the same will be transmitted to the wheel, thereby driving the vehicle. A dust cap 38 may be arranged on the end of the part 18, if desired and secured in place in any suitable manner.

Referring particularly to Figure 1 it will be noted that there is provided a ring 40 on the housing 5 and there is also provided a cover or housing part 41 arranged on the shaft 29, the same cooperating with the ring 40 and the housing 5 to form a complete housing for the universal joint. The ring 40 is preferably provided with a groove 42 which may be provided with packing, and it may be mentioned that I also provide a groove 43 in the part 5 in which packing may be arranged. The shaft parts 29 and 35 are each preferably formed with a shoulder at the inner end of the forks which may bear against part of the housing and maintain the parts against displacement. The cover part 41 does not rotate with the shaft 29. The housing is preferably packed with grease or filled with oil and it will be noted that the parts are so arranged that this lubrication will also lubricate the pins 12 and 13. The wheel bearing may also be packed with oil or grease. The bushing 40' arranged in the spindle 4 tends to prevent the escape of oil and provides for wear as the bushing may be replaced from time to time if desired and is necessary. A similar bushing may be arranged in cover part 41.

I have shown the knuckle provided with a steering arm 44 and this is connected with a tie-rod 45 with the knuckle at the opposite side. I have not considered it necessary to illustrate the steering mechanism itself which is operatively connected with the knuckles, as this is well known to those skilled in the art. In the particular mechanism illustrated the steering mechanism is connected with the knuckle at the opposite wheel, not shown, and the movement is transmitted from the tie-rod 45 to the arm 44. If desired a brake drum 46 may be mounted on one of the movable parts, as shown, the same being mounted on one of the universal joint parts 46 at the two sides of the differential housing, 47 being a brake band arranged to be controlled in any suitable manner, which when so controlled will grip the drums and tend to prevent rotation or driving of the parts.

The advantages of the type of drive illustrated are many: It will be noted that in the particular construction described there are but few parts. The motor may be reversed in the vehicle placing the fly wheel and bell housing toward the front of the car, and bolting the transmission in the usual manner thereto. The differential housing may be bolted to the transmission housing. It will be seen that the drive is direct from the driving shaft which projects over each side of differential through the universal joints to the shaft parts which transmit power to the outer shafts through the universal at the turning centers of the two front wheels. The turning is therefore taken by the universal joint in the front wheels while the action due to road shock is taken by both universal joints, that is, the ball universal joints and the standard universal joints referred to.

Due to the fewer parts and the better assembly manufacturing cost will be less. All of the shafting, from motor to axle required in a rear driven vehicle has been eliminated, as is also the pinion shaft and two pinion bearings. The vehicle may be constructed with a front drive similar to those with two simple drop forged axles for both front and rear wheels thereby eliminating many of the heavy and costly parts of the usual rear axle. As for assembly, I have a unit power plant and in the car do not only include the motor, clutch and transmission, but include the differential ring and pinion gear and emergency brakes. The construction permits the weight of the differential to be removed from the axle and placed so as to receive the shock of the road through the springs which is of great advantage since it not only decreases the wear and tear on the differential, by not having to take the direct road shock, but due to the increased ratio of the spring to unsprung weight, and at the same time having a lighter car, the tire mileage will be greatly increased. It is also found that efficiency is increased.

It will also be noted that with the construction described it is possible to place all working parts, except the rear wheel brakes under the hood, making the same accessible by merely raising the hood, instead of crawling under the rear of the car or raising the floor parts as is sometimes necessary on rear driven cars. It will be understood that the weight has been removed from the center, as in an ordinary car, to as far as possible from the center. Therefore with the same car weight the natural period of vibration due to spring action is increased giving substantially the same effects as increasing the wheel base. This greatly improves the riding qualities of the car. Other advantages of driving through the front wheels may be mentioned but it is not believed necessary to describe all this herein. While a front wheel drive is particularly described obviously the construction illustrated may be embodied in a rear wheel construction permitting a four wheel drive and steering with all wheels.

Having thus described my invention it is obvious that various immaterial modifications may be made in the same without departing from the spirit of my invention; hence I do not wish to be understood as limiting myself to the exact form, arrangement, construction and combination of parts herein shown and described or uses mentioned.

What I claim as new and desire to secure by Letters Patent is:

In a self-propelled vehicle having a differential, a front wheel drive comprising a fixed axle having a yoked end, a shaft section operatively connected to the differential to be driven thereby, a sleeve splined to the shaft section, a second shaft section secured to the sleeve and having an axis of rotation coincident with the axis of rotation of the first-mentioned shaft section, the second shaft section being spaced from the axle, a third shaft section, a universal joint between the second shaft section and the third shaft section, a second sleeve rotatably journaled upon the third shaft section and having a chamber accommodating the universal joint, the second sleeve secured to the yoke to pivot around an axis coincident with the center of the universal joint, a cover rotatably mounted upon the second shaft section for closing the chamber in the second sleeve, and a wheel mounted on the second sleeve and operatively connected to the third shaft section.

In testimony whereof, I have hereunto signed my name.

CLIFTON R. ROCHE.